Feb. 2, 1932.  C. C. ANDREWS ET AL  1,843,796
TWIN TRACTOR SCRAPER OR EXCAVATOR
Filed Nov. 26, 1930   3 Sheets-Sheet 3
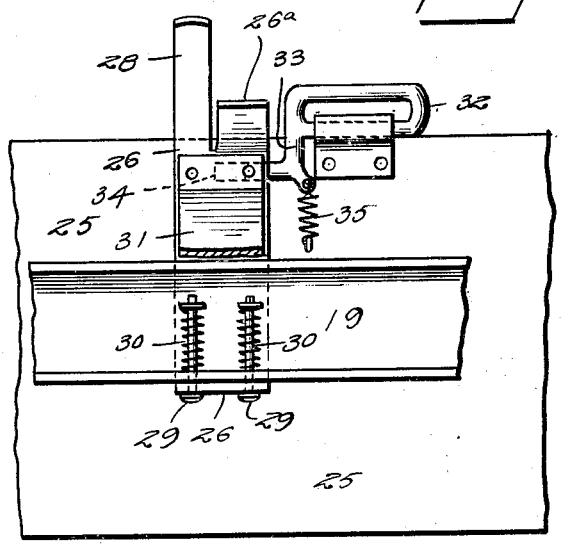
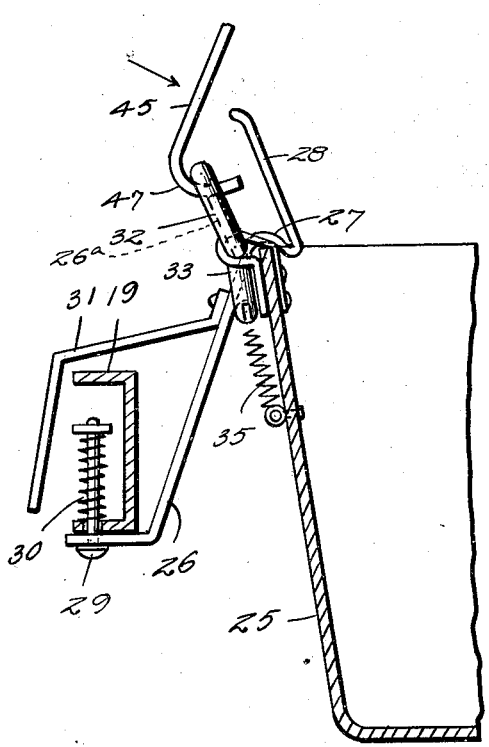
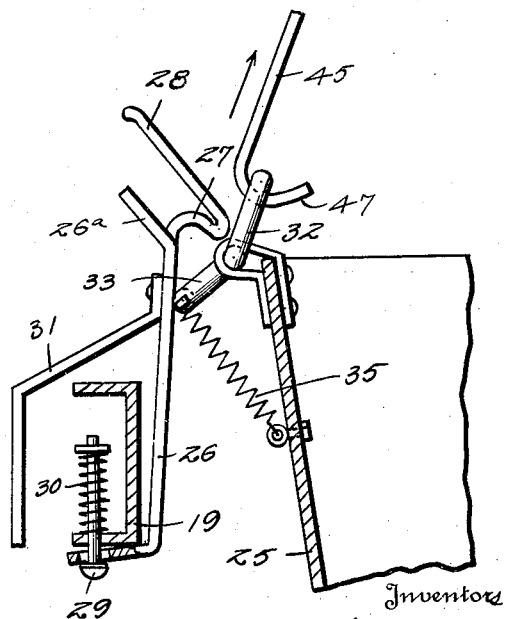
Inventors
C. C. Andrews
A. A. Andrews
By Watson E. Coleman
Attorney Patented Feb. 2, 1932

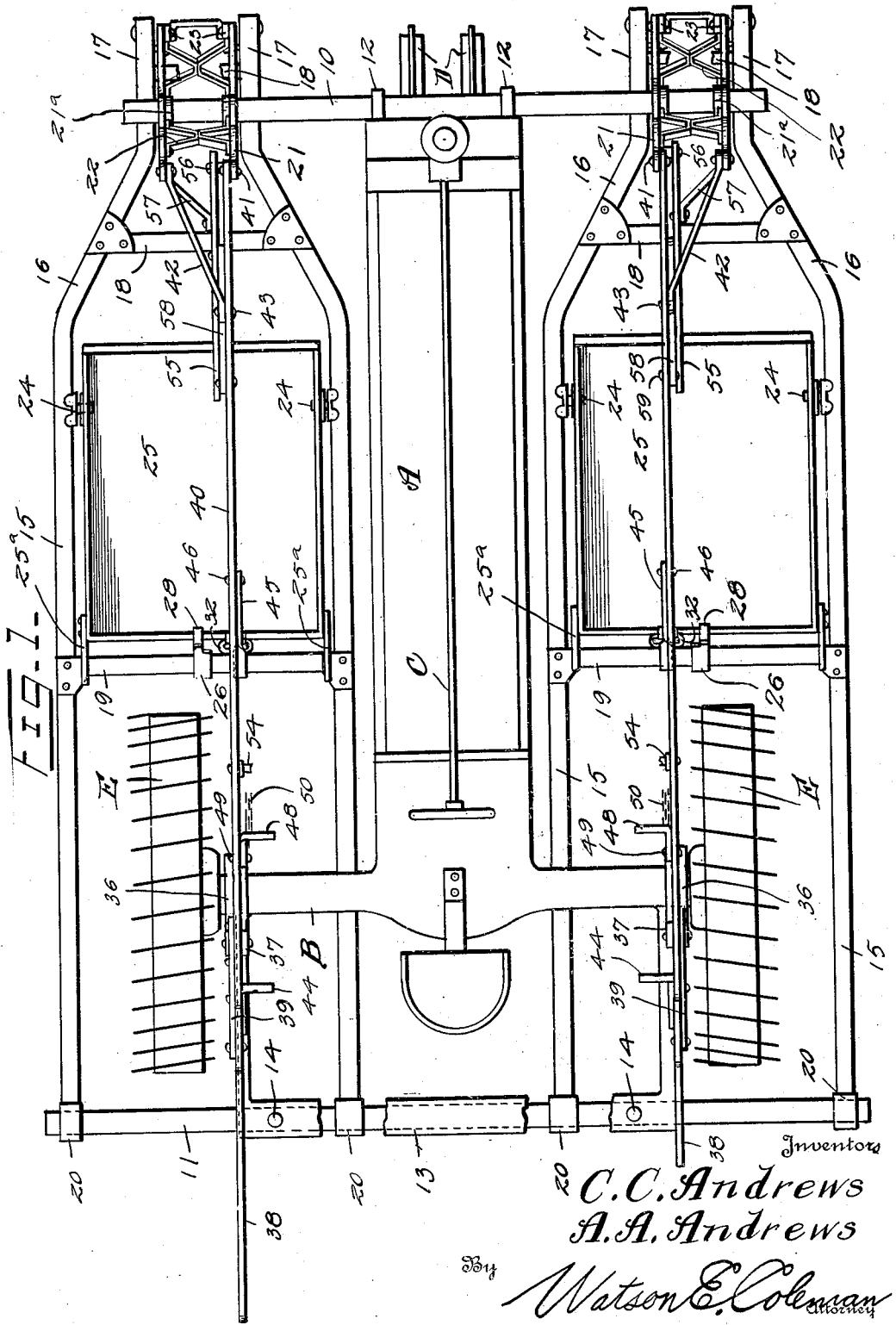

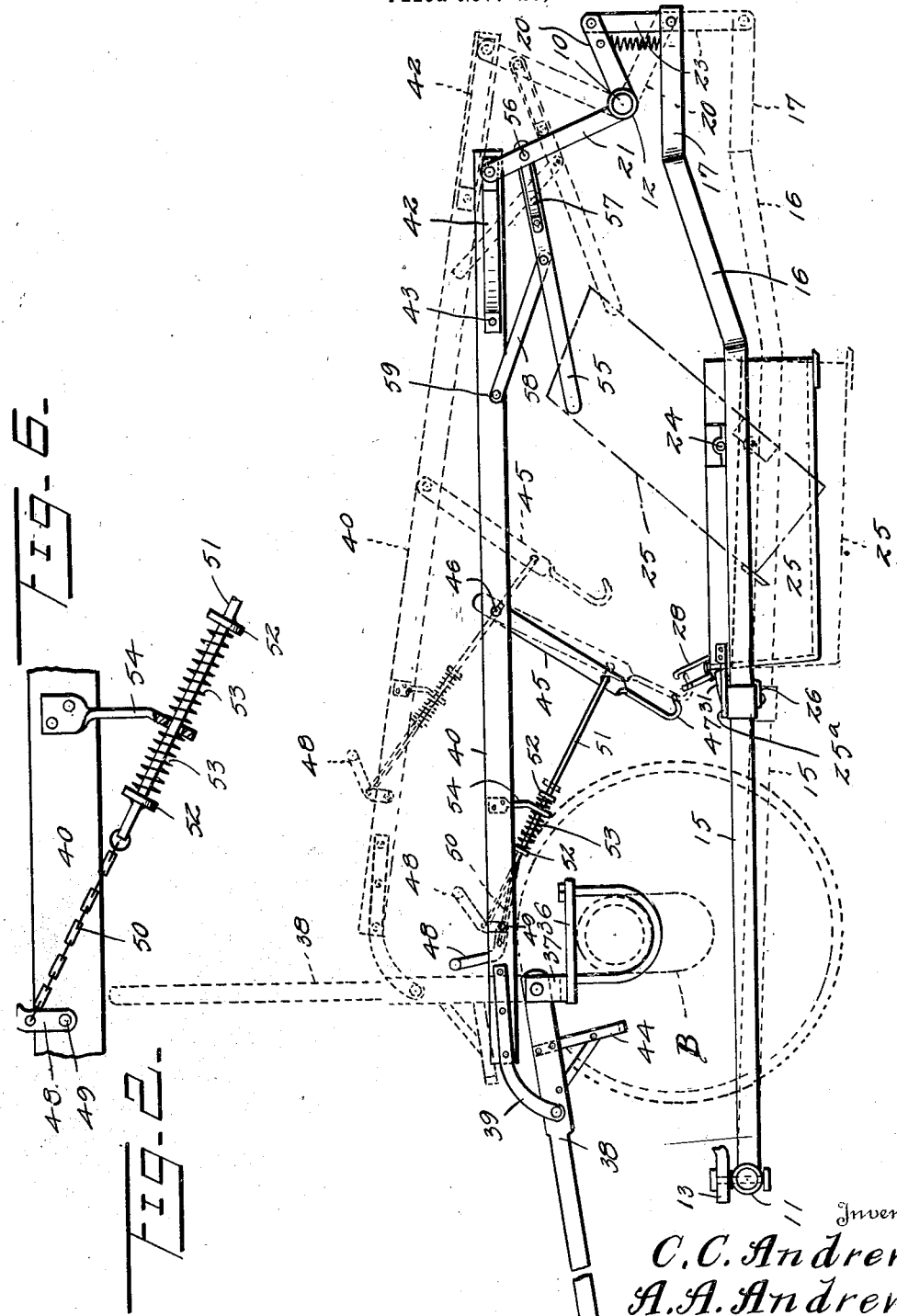

1,843,796

UNITED STATES PATENT OFFICE

CARL C. ANDREWS AND AARON A. ANDREWS, OF HARRIS, KANSAS

TWIN TRACTOR SCRAPER OR EXCAVATOR

Application filed November 26, 1930. Serial No. 498,464.

This invention relates to earth working appliances and particularly to scrapers. The general object of this invention is to provide scrapers mounted in connection with and upon a tractor and particularly to provide an attachment whereby two scrapers may be attached on opposite sides of a farm tractor by very simple means which in no way changes the action of the tractor itself, but which converts the tractor into an excavating machine of such character as to make it suitable for use in excavating ponds, building dikes, cutting ditches, grading in low places and in all kinds of road construction work or anywhere where dirt, sand, gravel or similar material is designed to be used with scrapers.

A further object is to provide means whereby the attachment and the load itself is carried on the tractor, thus making it possible to work in close places, and making it possible for the tractor to turn or back with its load which is not possible where scrapers are drawn behind the tractors or disposed in advance thereof.

A further object is to provide an attachment whereby a pivoted scraper or scrapers are mounted upon the tractor, the scrapers being normally held in an earth receiving position, the construction being such, however, that when it is desired to dump the scraper, the forward edge of the scraper may be caused to engage with the earth while the tractor moves forward, the rear end of the scraper being released so that as the tractor moves forward, the scraper bucket is tipped over to discharge the load and another object in this connection is to provide an automatic scraper return which will act to return the scraper to its normal or earth receiving position after it is dumped.

A further object is to provide a construction of this character which will permit the scrapers to be raised entirely from the ground or lowered at their forward ends into working position or dumped as previously described and to provide a scraper supporting attachment adapted to be mounted upon a tractor which will support two scrapers one on each side of the tractor.

Other objects will appear in the course of the following description.

Our invention is illustrated in the accompanying drawings, wherein:—

Figure 1 is a top plan view of a tractor with our excavator mechanism applied thereto;

Figure 2 is a side elevation of the excavator mechanism on one side of the tractor showing in dotted and dot and dash lines the various positions taken by the several parts;

Figure 3 is a fragmentary rear elevation of the excavator and its latch, the cover for the springs being in section;

Figure 4 is a vertical sectional view through the rear end of the excavator and the cross bar, showing the parts in the position taken just before the latch is released;

Figure 5 is a like view to Figure 4 showing the position of the parts when the latch has been released and the lifting link is just about to lift the rear end of the excavator;

Figure 6 is a detailed elevation of the means for operating the link 45, the plate 54 being in section.

Referring to these drawings, A designates a tractor such as an ordinary form of farm tractor, the tractor having forward steering wheels D and two rear wheels E, the rear wheels being mounted upon a rear axle housing designated B, there being a driver's seat mounted upon the body of the tractor and there being a steering shaft C extending forward from the driving seat and operatively connected to the forward wheel. While we have designed this machine with particular reference to one particular form of tractor, it is obvious that it may be applied to other forms of tractors.

Our attachment includes a forward cylindrical cross bar designated 10 and a rear cross bar also preferably cylindrical and designated 11. The forward cross bar is connected to the body of the tractor in any suitable manner, as for instance by the connections 12. The rear cross bar 11 rests upon the draw bar 13 of the tractor and is bolted thereto by bolts 14. Swingingly mounted upon the rear cross bar 11 on each side of the tractor body are the longitudinally extending channel iron bars 15. It is to be understood that there are a pair of these bars on each side of the tractor. The bars 15 of each pair extend forward to the desired distance and then are extended upward and toward each other at 16 and then extend parallel to each other as at 17. These bars are connected intermediate their ends by the transverse braces 18 and 19 and by any other suitable braces which may be considered requisite or necessary.

The forward ends of the longitudinal bars 15 are disposed below the transverse bar 10. The rear ends of the bars 15 are swingingly connected to the transverse bar 11 by means of eyes 20 or in any other suitable manner permitting these bars 15 to swing vertically. It will be seen, of course, that the same construction applies to the frames on both sides of the body of the tractor.

The forward ends of the bars 15 are operatively supported from the transverse member 10 by means of a pair of bell crank levers 21. These levers are connected to each other by U-shaped braces 22 or in any other suitable manner so that both levers operate as a unit. These levers are oscillatably mounted upon the bar 10 by means of the U-bolts 21a or in any other suitable manner. The forward ends of the levers are connected by the links 23 to the forward ends of the bars 15. The means whereby these levers 21 are rocked will be later described.

Pivotally mounted upon trunnions 24 or other equivalent devices and disposed between each pair of bars 15 is a scraper or excavator 25 approximately U-shaped in cross section and closed at its rear end but open at its forward end. This scraper operates between the bars 15 as previously stated. Upon the channel iron 19 there is mounted a latch designated generally 26 whose upper end has a downwardly and forwardly extended detent tooth 27 having an upward and rearward extension 28. The shank of this latch 26 extends downward in front of the channel iron 19 and then beneath this channel iron and is yieldingly held to the channel iron by means of bolts 29 extending upward through the angular end of the latch and through the lower flange of the channel iron, these bolts being surrounded by the springs 30.

These bolts cause the latch to rock on the forward corner of channel iron 19 so that the upper end of the latch is thrown forward over the upper edge of the rear wall of the scraper as shown in Figure 4. A shield 31 is attached to the latch shank and extends rearward and downward over springs 30, thus protecting the springs and the lower end of the shank from dirt and dust.

Pivoted upon the upper edge of the rear wall of the scraper is a ring or eye 32 which has a downwardly and rearwardly extending arm 33, having a laterally extending portion 34 beneath latch 26 acting as a crank arm so that when the ring 32 is forced forward at its upper end, this arm 33, 34 will engage beneath the latch and shift the latch rearward, thus releasing the bucket. A spring 35 resists this action and thus holds loop 32 in an upwardly and rearwardly inclined position shown in Figure 4. The shank of latch 26 has an upwardly and rearwardly extending portion 26a. This is to guide the crank arm 34 down into position on the scraper side of the latch when the scraper is returned to its normal position. Otherwise than described, the scraper 25 may be of any suitable construction. Attached to the rear end of the scraper are lugs 25a engaging over the cross bar 19. It will be seen that, assuming the excavator bucket is lowered and filled with material, if then the forward end of the excavator engages the ground and the rear end is freed, a forward movement of the tractor will cause the excavator to be overturned to thereby dump its load, but in a normal position, the excavator is so supported, that when the supporting bars 15 are lowered, the forward edge of the excavator will engage the ground and the excavated material will pass into the excavator and fill it.

For the purpose of raising or lowering the forward ends of the bars 15 and for releasing the excavator, we provide mechanism now to be described, it being understood that while we will describe the mechanism as being applied on one side of the tractor, it is equally applicable to the mechanism on the other side of the tractor.

Mounted upon the housing B is a base plate 36 which may be riveted, bolted or otherwise attached to the housing. This base plate carries the upwardly extending ears 37 between which is pivoted the operating lever 38. This lever normally extends rearward in a substantially horizontal plane. Pivotally connected to this lever by means of the curved iron 39 is an operating rod 40 which extends forward and at its forward end is pivotally connected to the rear arms of the bell crank levers 21. To this end, the rod 40 is pivoted at 41 to the rearmost arm of one of the levers 21 and attached to the other lever is the brace 42 which extends toward the rod 40 and is pivoted at 43 thereto. It will be seen, therefore, that when the rod 40 is shifted forward, the bell crank levers 21 will be rocked to depress the forward ends of the bars 15 and when the rod 40 is retracted, the forward ends of the bell crank levers will be raised, thus raising the forward ends of the bars 15. This movement of the rod 40 is, of course, secured by the lever 38 and it is to be particularly noted that when the lever 38 is disposed in the position shown in Figure 2, the pivotal connection of the lever to the iron 39 is below the pivotal connection of the lever to the ears 37 and thus the lever will be held against any lifting movement and this in itself locks the bar 40 from any forward movement until the lever is lifted.

When the lever is lifted to the dotted line position shown in Figure 2, the bar 40 is moved forward. In order to depress this lever 38 against a load, it is necessary to provide the lever 38 with a stirrup or step 44 upon which the operator may place his foot so that his weight may be utilized for the purpose of shifting the lever from a vertical position to a position below the horizontal.

For the purpose of releasing the latch 26 from its engagement with the excavator and lifting the rear end of the excavator so that the forward end may engage the ground to thereby permit the excavator to dump, we provide a swinging link 45 pivoted at 46 upon the bar 40, the lower end of this link being formed with a hook 47 engageable in the ring or loop 32. For the purpose of swinging this link 45, we provide a manually operable lever 48. This lever is pivoted at 49 upon the rod 40 and has a handle whereby it may be manipulated. This lever intermediate its free end and the pivotal point 49 is connected by a chain 50 to a rod 51 which in turn is pivotally connected to the link 45. This rod carries upon it the two collars 52 and between these collars there are disposed two coiled compression springs 53 (see Figure 6). Mounted upon each of the rods 40 there is a plate 54 through which the rod passes and which engages between the springs 53. Thus these springs will yieldingly resist any movement of the rod 51 in either direction and at the same time when the lever 48 is turned to a position releasing the link 45, the spring 53 will act to positively force the rod 51 and the link 45 downward and forward. When the link 45 is shifted downward and forward by the release of the lever 48, the hooked end of the lever 47 shifts beneath the loop or ring 32 and if now the lever 38 be swung upward to a vertical position, which will act to depress the forward ends of the supporting bars, the link 45 will be moved upward into engagement with the eye or ring 32 and will pull this ring from the position shown in Figure 4 to that shown in Figure 5, causing the crank arm 33, 34 to swing the detent latch rearward, thus freeing the upper end of the bucket and a further upward movement of the bar 40 due to a further upward movement of the lever 38 will raise the rear end of the excavator 25 and depress its forward end into contact with the ground, whereupon, on a forward movement of the tractor, the excavator will be caused to rotate upon its pivots 24 to a dumping position as shown in dot and dash lines in Figure 2. To automatically return the excavator to its normal position after it has been dumped, we mount upon the inside bell crank lever 21, the pivoted arm 55. This arm is pivoted at 56 to the inside bell crank lever 21 and is also pivoted to the outside bell crank lever by means of the iron 57. Intermediate its ends, the arm is pivoted to a link 58 which in turn is pivoted at 59 to the bar 40. When the excavator is raised, that is, when the forward ends of the bars 15 are raised and the excavator is locked in position upon these bars, the arm 55 will stand in the position shown in full lines in Figure 4, but when the lever 38 is turned into a vertical position, thus lowering the forward ends of the supporting bars 15, the arm 55 will be swung downward as shown in dotted lines in Figure 2. Now when the excavator is dumped, the rear end of the excavator will swing over, will strike upon this arm 55 and when the bar 40 is retracted and the forward ends of the supporting bars 15 are again raised, the arm 55 will swing upward, thus swinging the rear end of the excavator upward and rearward, causing the excavator by its momentum to swing back to its original position and be automatically latched by passing the nose 28 of the detent 27. The parts will then be in their original position.

It will be seen that with this mechanism, it is possible for the forward ends of the supporting bars 15 and the forward end of the excavator supported thereby to be lowered into engagement with the ground without, however, releasing the latch 26 so that the rear end of the excavator is held from rising as shown in dotted lines in Figure 2. Then upon a forward movement of the tractor, the excavator will dig into the ground and fill, the forward ends of the bars 15 will then be raised by depressing the lever 38 which, when it is depressed to the position shown in Figure 2, will be held in this position and the tractor may be then moved to a place where the earth is to be dumped. When it arrives at this position, the lever 48 is released, thus swinging the hook 45 forward and engaging the hook end thereof of any ring 32. Then as lever 38 is raised to its vertical position, the rear end of the excavator will be released and elevated and the excavator will be turned upon its pivots and dumped as before stated.

As before remarked, there are two of these excavators and their supporting means therefor disposed one on each side of the tractor. Both of these excavators may be operated at the same time or not as desired because each excavator is independently movable with relation to the other excavator. Of course, under normal circumstances and to distribute properly the stress on the tractor, both excavators will be operated.

By mounting the excavators upon the tractor frame as described, the weight of the load is most efficiently balanced or distributed upon the frame midway between the rear driving wheels and the front steering wheel of the tractor. Under these circumstances, the tractor may be backed, or turned or moved forward without difficulty, thus permitting the tractor to be operated within a very limited space.

This is impossible where the excavator is either hauled by the tractor at the rear thereof or mounted on push bars in front of the tractor. It will be seen, of course, that this attachment may be readily removed from its engagement with the tractor frame to permit the tractor to be used for other purposes, but as a matter of fact with the excavators raised, the tractor can be used for hauling or for any other work for which the tractor is suitable. It will be seen in Figure 2 that we have shown in full lines the position of the parts when the excavator is raised and either full or empty; that we have shown in dotted lines the position of the excavator when loading and in dot and dash lines, we have shown the position of the excavator when rotated to a dumping position.

We claim:—

1. In an implement of the character described, a pair of supporting bars pivotally supported at their rear ends and vertically movable at their forward ends, an excavator disposed between the supporting bars and pivoted adjacent its forward end to the supporting bars, the forward end of the excavator being open and the rear ends and sides being closed, manually operable means for raising or lowering the forward ends of the supporting bars, a latch engaging the rear end of the excavator and holding it from pivotal movement upon the bars, and manually operable means for releasing the latch to thereby permit the excavator to be rotated to dumping position, including a hook swingingly mounted on said manually operable means, and adapted when swung in one direction to operatively engage the rear end of the scraper and release the latch, and manually operable means for swinging said hook into or out of operative position.

2. In an implement of the character described, a supporting frame, a pair of supporting bars pivotally mounted at their rear ends upon the frame, and vertically movable at their forward ends, an excavator disposed between and pivotally mounted adjacent its forward end upon said supporting bars, the excavator being closed at its rear end, a resiliently actuated latch holding the rear end of the excavator from upward movement, bell crank levers pivotally supported upon said frame, and having link connection at their forward ends to the forward ends of the supporting bars, a longitudinally movable operating rod connected to said bell crank levers and extending rearward above the supporting bars, a lever pivotally mounted upon the supporting frame and engaging with the rear end of said rod, said lever when turned rearward operating the rod rearward, causing the lifting of the forward end of the supporting bars, a reverse movement of the lever causing the depression of the supporting bars, a member mounted upon said operating rod and having a hook end adapted when shifted into operative position to operatively disengage said latch from the rear end of the excavator and lift the rear end of the excavator when the operating bar is moved forward, manually operable means for shifting said member into or out of its latch and excavator engaging position.

3. In an implement of the character described, a supporting frame, longitudinally extending supporting bars pivotally mounted upon the frame at their rear ends, and having a transversely extending brace, an excavator disposed between and pivotally mounted upon said supporting bars, the rear end of the excavator being closed, a resiliently actuated latch mounted upon the transverse brace and normally engaging the rear end of the excavator, to prevent its upward movement, the rear end of the excavator having an eye, bell crank levers pivotally mounted upon the supporting frame and at their forward ends having linked connection to the forward ends of the supporting bars, a longitudinally reciprocatable operating rod pivotally connected at its forward end to the bell crank levers, manually operable means at the rear end of the rod whereby the rod may be reciprocated, and means mounted upon said rod and manually shiftable into or out of operative position for engaging the eye on the rear end of the excavator, and operatively disengaging the latch to release it from engagement with the excavator when the operating rod is shifted forward.

4. In an implement of the character described, a supporting frame, longitudinally extending supporting bars pivotally mounted upon the frame at their rear ends, and having a transversely extending brace, an excavator disposed between and pivotally mounted upon said supporting bars, the rear end of the excavator being closed, a resiliently actuated latch mounted upon the transverse brace and normally engaging the rear end of the excavator to prevent its upward movement, the rear end of the excavator having an eye, bell crank levers pivotally mounted upon the supporting frame and at their forward ends having linked connection to the forward ends of the supporting bars, a longitudinally reciprocatable operating rod pivotally connected at its forward end to the bell crank levers, manually operable means at the rear end of the rod whereby the rod may be reciprocated, and means mounted upon said rod and manually shiftable into or out of operative position for engaging the eye on the rear end of the excavator, and operatively disengaging the latch from the rear end of the excavator when the operating rod is shifted forward, and a member carried by said bell crank levers adapted to be swung downward and forward as the bell crank levers are swung to depress the forward end of the supporting bars and adapted to receive the rear end of the excavator when it is overturned, said member acting to lift the rear end of the excavator and return it to its initial position when the operating rod is pulled rearward.

5. An implement of the character described, including a supporting frame, parallel supporting bars mounted pivotally upon the frame at their rear ends, the forward ends of the bars being vertically movable, an excavator disposed between and pivotally mounted upon said bars adjacent its forward end, the rear end of the excavator being closed, a transverse brace on the supporting bars, just behind the rear end of the excavator, a resilient latch engaging with the rear end of the excavator, means for releasing the latch including a ring pivoted to the rear wall of the excavator and having a portion extending beneath the latch, which, when the ring is swung forward and upward, lifts the latch from its engagement with the excavator, a longitudinally reciprocatable operating rod, manually operable means for reciprocating said rod, means connected to the forward end of the rod to cause the raising or lowering of the forward ends of the supporting bars as the rod is reciprocated, and a member having a hook pivoted on said operating rod and extending downward behind said latch, said member being manually shiftable into or out of operative position and when in operative position engaging the ring as the operating rod is shifted forward, and causing the oscillation of said ring and the detachment of the latch and the subsequent lifting of the rear end of the excavator whereby the excavator may be overturned and dumped.

6. An implement of the character described, including a supporting frame, parallel supporting bars mounted pivotally upon the frame at their rear ends, the forward ends of the bars being vertically movable, an excavator disposed between and pivotally mounted upon said bars, adjacent its forward end, the rear end of the excavator being closed, a transverse brace on the supporting bars, just behind the rear end of the excavator, a resilient latch engaging with the rear end of the excavator, means for releasing the latch including a ring pivoted to the rear wall of the excavator and having a portion extending beneath the latch which, when the ring is swung forward and upward, lifts the latch from its engagement with the excavator, a longitudinally reciprocatable operating rod, manually operable means for reciprocating said rod, means connected to the forward end of the rod to cause the raising or lowering of the forward ends of the supporting bars as the rod is reciprocated, and a member having a hook pivoted on said operating rod and extending downward behind said latch, said member being manually shiftable into or out of operative position and when in operative position engaging the ring as the operating rod is shifted forward, and causing the oscillation of said ring and the detachment of the latch and the subsequent lifting of the rear end of the excavator whereby the excavator may be overturned and dumped, and means receiving the rear end of the excavator as it is overturned and actuated by said operating rod to return the excavator to its normal position when the operating rod is retracted.

7. In an implement of the character described, an excavator pivotally mounted adjacent its forward end, the rear end of the excavator being closed, a transverse member disposed at the rear end of the excavator, a latch formed of a strip of metal having a portion extending beneath said transverse member, springs disposed upon said transverse member, bolts passing through the springs and into that portion of the latch beneath the member, whereby said latch is resiliently held in a normal position with the upper end of the latch engaging over the rear wall of the excavator, a ring swingingly mounted upon the rear wall of the excavator adjacent the latch, said ring having an angularly disposed off-set arm extending beneath the latch, a spring urging the ring into a position with the arm disposed toward the rear wall of the excavator, manually operable means for raising or lowering the forward end of the excavator and including a longitudinally reciprocatable element, a hook member pivoted to the element and having its hooked end disposed rearward of and below said ring, and manually operable means for shifting the hook element into a position to engage said ring as the hook element is shifted forward and upward by the movement of the reciprocatable element to thereby swing said ring and disengage the latch and permit the rear end of the latch to be engaged by the hooked element.

8. An implement of the character described, including a supporting frame, a pair of supporting bars pivotally mounted at their rear ends upon the supporting frame for vertical movement, an excavator disposed between and pivotally mounted upon said bars adjacent its forward end, the rear end of the excavator being closed, a brace extending across said bars rearward of the excavator, a latch operatively mounted upon said brace, and normally engaging over the rear end of the excavator, the latch being resiliently held in this position but adapted to swing upward and rearward away from the excavator, a ring swinging mounted upon the rear wall of the excavator and having an angularly disposed arm with an off-set portion extending beneath the latch, a spring urging said ring rearward with its arm against the excavator, a bell crank lever operatively mounted upon the supporting frame and having link connection to the forward ends of the supporting bars, a longitudinally reciprocatable operating rod pivoted to said bell crank lever at its forward end, a manually operable lever movable forward and rearward in a vertical plane, and pivotally connected intermediate its ends to the rear end of the operating rod, said lever when turned into an approximately horizontal position rearward carrying its point of pivotal connection to the operating rod below the fulcrum of the lever, a link pivoted to the operating rod and normally extending downward and rearward and having a hook at its ends normally disposed behind and below said ring, but out of a position to engage therewith, a rod pivoted to said link, a manually operable lever mounted upon said operating rod and operatively connected to the rod engaging the link whereby the link may be shifted forward or rearward into or out of operative position, said link when shifted into an operative position and when the operating rod is moved upward and forward by the lever at its rear end engaging said ring to thereby cause the release of the latch and the lifting of the rear end of the excavator whereby to permit the excavator to be overturned and dumped.

9. The combination with a tractor, of a transversely extending supporting member mounted upon the rear end of the tractor rearward of the driving wheels thereof, two pairs of supporting bars disposed one pair on each side of the tractor, the bars of each pair being disposed on each side of the corresponding wheel of the tractor, said supporting bars being pivotally connected with the transverse member, an excavator pivotally supported between and on each pair of supporting bars, the rear end of the excavator being closed, manually releasable means carried by each pair of bars for holding the rear end of the excavator from upward movement, a pair of bell crank levers detachably mounted upon the forward end of the tractor frame, one for each pair of supporting bars and operatively connected to the supporting bars, an operating rod for each bell crank lever and extending above the supporting bars, manually operable means for each operating rod detachably supported upon the frame of the tractor.

10. The combination with a tractor having a body, a transversely extending rear axle housing, rear driving wheels thereon and a draw bar, of an attachment member mounted at its rear end upon said draw bar, a pair of supporting bars disposed on each side of the body and extending longitudinally thereof and pivotally engaged with the rear end of the attachment member for vertical movement, an excavator pivotally mounted between each pair of supporting bars, the rear end of the excavator being closed, manually releasable means for holding the rear end of each excavator from lifting movement, a transverse bar mounted upon the forward end of the tractor, and extending above the forward ends of the supporting bars, bell crank levers mounted upon said transverse bar and operatively connected to the forward ends of the supporting bars, manually operable means mounted upon the rear axle housing of the tractor whereby the bell crank levers may be operated to raise or lower the forward ends of the supporting bars, each independent of the other, the forward movement of the tractor when the excavator latching means is released and the forward ends of the supporting bars are depressed, causing the overturning of the excavators to dump the same, and means connected to the bell crank levers to receive the rear end of the excavator when it is overturned and cause the return movement of the excavator to its initial position when the bell crank levers are raised.

11. The combination with a tractor having a body, a transversely extending axle housing at the rear of the body, rear driving wheels carried by said housing and a front steering wheel, of means detachably engaged with the tractor for supporting excavators on each side of the body of the tractor forward of the rear wheels including an attachment member engaged with the frame of the tractor and extending on opposite sides of the tractor forward of the rear wheels, excavators disposed one on each side of the tractor forward of the rear wheels, and pivotally mounted upon said attachment member for tilting movement, manually controllable means for raising or lowering the forward end of the attachment member, and manually controlled means for tilting the excavators upward and forward to cause them to dump.

12. The combination with a tractor, of a transversely extending supporting member mounted upon the rear end of the tractor rearward of the driving wheels thereof, two pairs of supporting bars disposed one pair on each side of the tractor, the bars of each pair being disposed on each side of the corresponding wheel of the tractor, said supporting bars being pivotally connected with the transverse member, an excavator pivotally supported between and on each pair of supporting bars, the rear end of the excavator being closed, manually releasable means carried by each pair of the bars for holding the rear end of the excavator from upward movement, levers one for each pair of supporting bars operatively connected to the forward ends of the supporting bars, and operatively mounted upon the tractor, and manually operable means for each of said levers mounted upon the tractor adjacent the rear end thereof.

13. In an earth working implement of the character described, a tractor frame having a forward steering wheel and two rear tractor wheels, two pairs of longitudinally extending excavator supporting bars disposed one pair on each side of the tractor, each pair of bars being pivotally supported at their rear ends, manually controlled means for raising or lowering the forward ends of the supporting bars, two excavators each pivotally mounted between and supported by the corresponding pair of supporting bars, and means for each excavator for holding the rear end of the excavator from upward movement, and manually controlled means for releasing the holding means and lifting the rear end of the excavator to thereby tilt the excavator and bring its forward edge in engagement with the ground and permit the excavator to dump.

In testimony whereof we hereunto affix our signatures.

CARL C. ANDREWS.
AARON A. ANDREWS.